United States Patent [19]

Hoffman

[11] Patent Number: 5,054,567
[45] Date of Patent: Oct. 8, 1991

[54] TRUCK HOOD REINFORCEMENT SYSTEM

[75] Inventor: Lawrence A. Hoffman, Hoagland, Ind.

[73] Assignee: Navistar International Transportation Corp., Chicago, Ill.

[21] Appl. No.: 374,500

[22] Filed: Jun. 30, 1989

[51] Int. Cl.$^5$ ............................................. B60K 11/00
[52] U.S. Cl. ................................. 180/68.2; 180/68.3; 180/69.21
[58] Field of Search ..................... 180/68.1, 68.2, 68.3, 180/69.2, 69.21, 68.6, 69.22, 89.14, 89.15

[56] References Cited

U.S. PATENT DOCUMENTS

| | | | |
|---|---|---|---|
| 2,051,263 | 8/1936 | MacPherson et al. | 180/69.2 |
| 3,232,368 | 2/1966 | Sullivan | 180/69 |
| 4,281,733 | 8/1981 | Miller et al. | 180/69.2 |
| 4,634,167 | 1/1987 | Moriki et al. | 180/69.2 |
| 4,842,319 | 6/1989 | Ziegler et al. | 180/68.6 |
| 4,917,203 | 4/1990 | Sacco et al. | 180/68.6 |

FOREIGN PATENT DOCUMENTS

| | | | |
|---|---|---|---|
| 69616 | 8/1941 | Czechoslovakia | 180/68.1 |
| 1958865 | 2/1972 | Fed. Rep. of Germany | 180/69.21 |
| 3738505 | 12/1988 | Fed. Rep. of Germany | 180/68.6 |

Primary Examiner—Andres Kashnikow
Assistant Examiner—Eric Culbreth
Attorney, Agent, or Firm—F. David AuBuchon; Dennis K. Sullivan

[57] ABSTRACT

A vehicle hood of the type disposed to open forwardly of said vehicle and pivot about a horizontal axis to expose an engine compartment thereof has a plastic composite exterior skin defining a portion of the engine compartment and including a forwardly located ambient air inlet to said engine compartment, and a generally vertical front reinforcement member bonded within the skin adjacent the ambient air inlet and having grillework integrally formed therein within the ambient air inlet, the grillework preferably being the only grillework. The front reinforcement further includes vehicle light housings integrally molded therewith and extending laterally to the fender area of the hood, the hood skin being bonded to the light housings. The light housings preferably receive both the headlight and the turn signal which are inserted through apertures in the exterior skin of the hood.

12 Claims, 2 Drawing Sheets

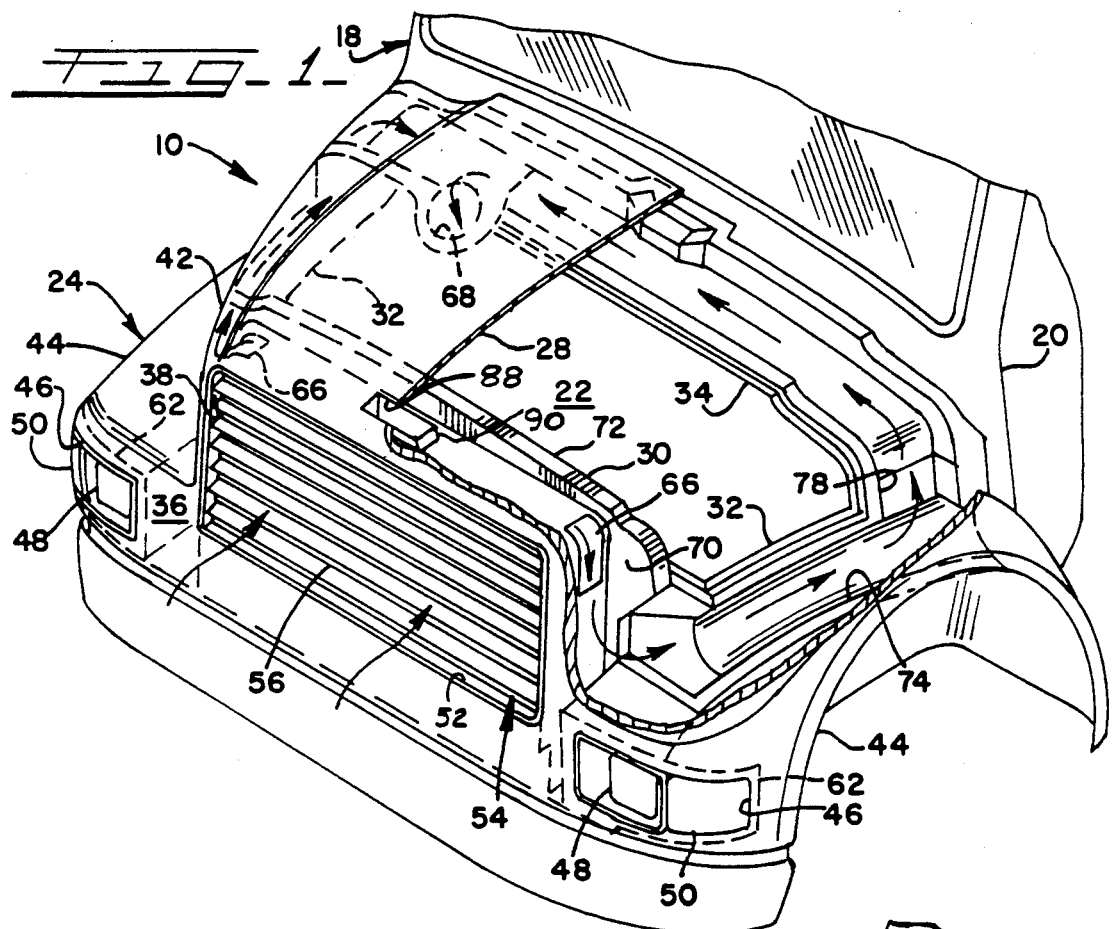
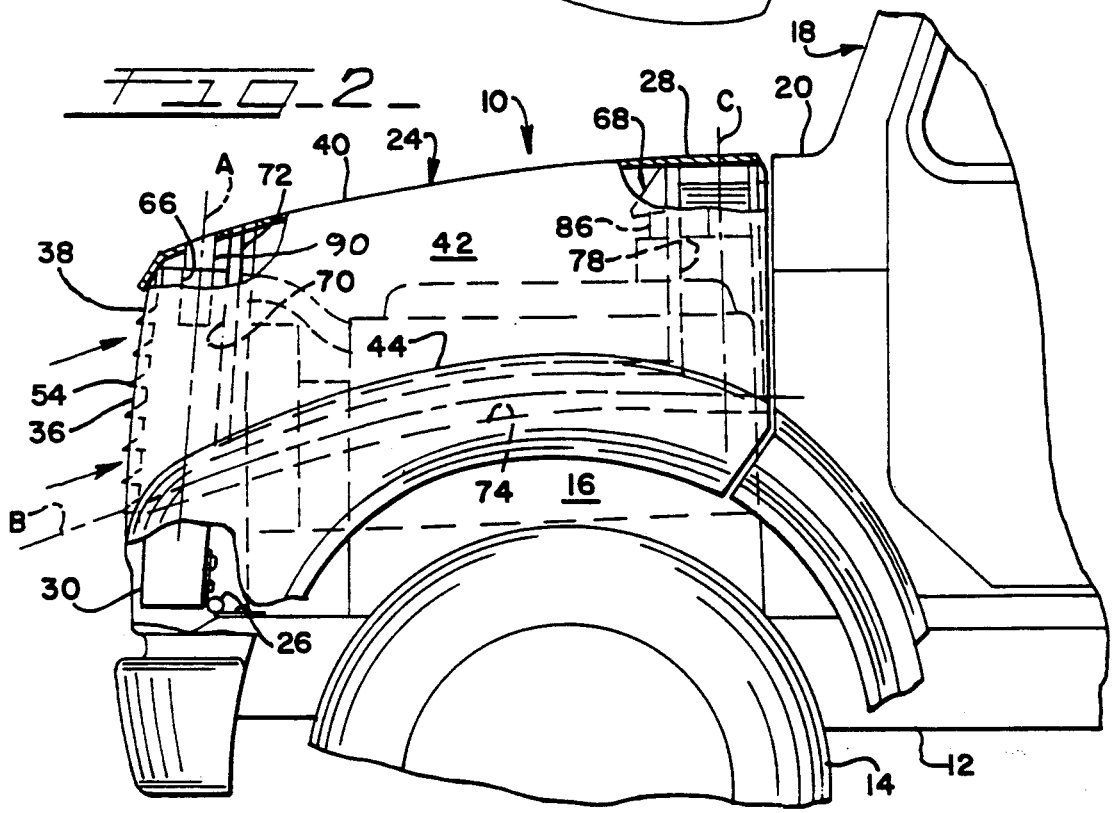

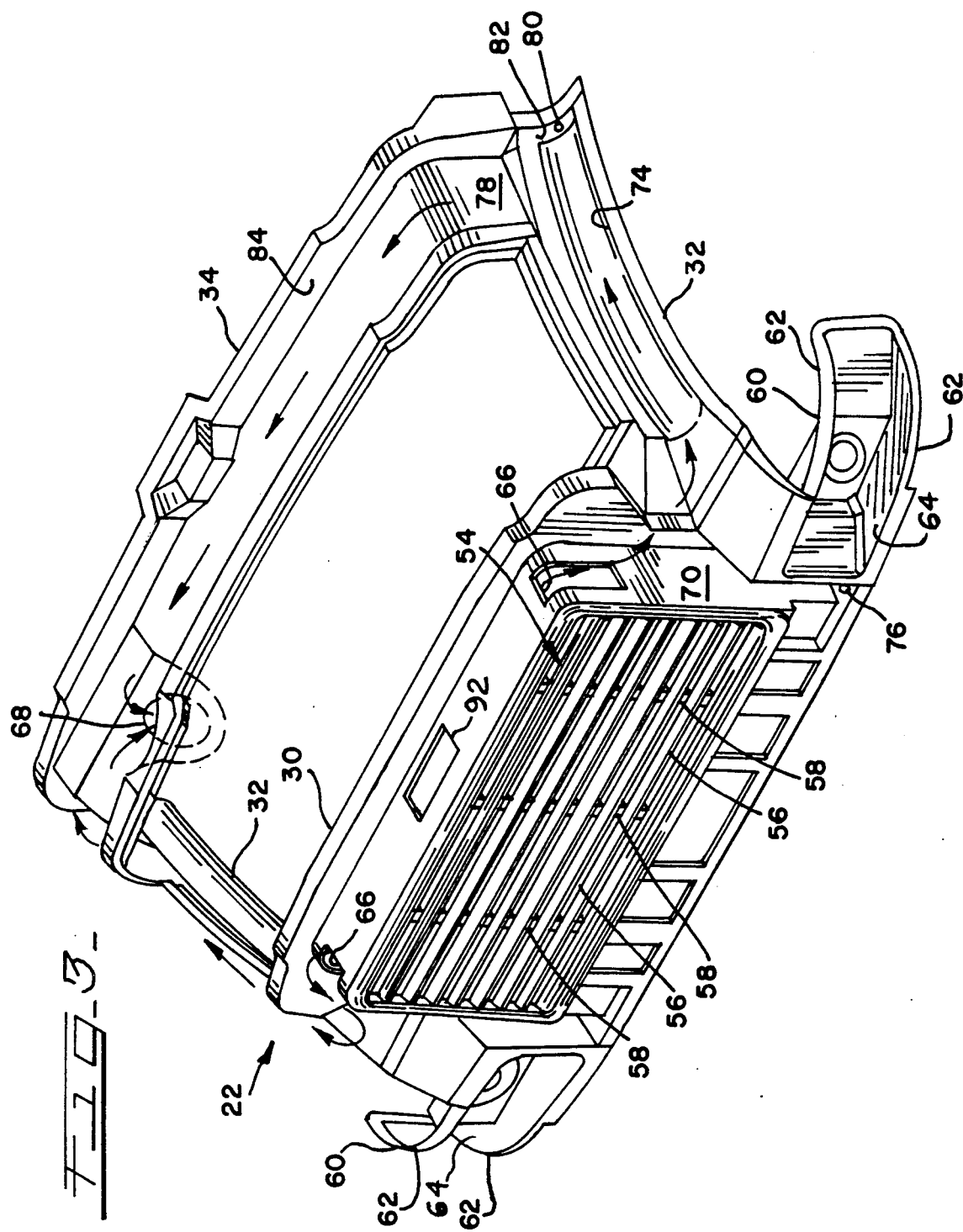

TRUCK HOOD REINFORCEMENT SYSTEM

CROSS-REFERENCE TO RELATED APPLICATION

This application is related to U.S. applications Ser. No. 07/374,496, now U.S. Pat. No. 4,471,172, and Ser. No. 374,672, both filed June 30, 1989 and assigned to the assignee hereof.

BACKGROUND OF THE INVENTION

This invention relates to vehicle hoods, particularly truck hoods, of the type which encloses the engine compartment and tilts forwardly away from the truck chassis to expose the engine for service and, more particularly, to a hood reinforcement system therefor wherein the grille is integrally molded into the front reinforcement and wherein the housings for the vehicle lights located on the fenders are integrally molded into the front reinforcement.

THE PRIOR ART

It is previously known to provide a front reinforcement for a truck hood. U.S. Pat. No. 3,232,368 to Sullivan teaches a molded fiberglass hood having a front reinforcement bonded to the skin. Although not shown in Sullivan, present day commercial vehicles have hood front reinforcements which define a picture frame around the grille opening and a separate grille attached thereto by fasteners. With this type of front reinforcement, when a front tire of the truck hits a bump, a racking load is transmitted into the grille area which distorts the rectangular opening by opening or closing opposite corners of the picture frame and produces relative movement between the bolt-on grille and the hood assembly as well as high stresses in the corners.

Yet another problem with prior hoods is that the fender areas of the hood are often not reinforced or are only locally reinforced. Yet, the dynamic forces transmitted between the hood hinge brackets attached to the front reinforcement adjacent the headlights and the fender may produce undesirably high stresses in the unreinforced region of the fender or in the joint area therebetween, especially when the headlight and turn signal housings are mounted directly to the exterior skin of the hood, since there is only a single thickness of material to support the front of the fender.

SUMMARY OF THE INVENTION

In the present invention, the foregoing problems are resolved, on the one hand, by integrally forming the grille into the front reinforcement and, on the other, by integrally forming the vehicle light housings into the front reinforcement. The integral grillework substantially reinforces the picture frame area against racking loads transmitted thereto and additional eliminates appearance and noise problems which may result from a bolt-on grille loosening. Integrally forming the light housings into the front reinforcement greatly increases the strength and stiffness of the hood assembly especially in the previously susceptible areas of the hood outer skin and the bond joint between the skin and the reinforcement adjacent the previously unreinforced region.

It is a primary object of the invention described and claimed herein to provide a vehicle hood reinforcement system wherein the vehicle grille is integrally incorporated in the front reinforcement of the hood to reinforce the hood against racking loads.

Yet another a primary object of the invention described and claimed herein is to provide a vehicle hood reinforcement system wherein light housings are integrally incorporated in the front reinforcement and extend into the fender areas of the hood whereat they are bonded to the exterior skin.

These and other objects as will become apparent are specifically met in a vehicle hood of the type disposed to open forwardly of said vehicle and pivot about a horizontal axis to expose an engine compartment thereof, the hood having a plastic composite exterior skin defining a portion of the engine compartment and including a forwardly located ambient air inlet to said engine compartment, and a generally vertical front reinforcement member bonded within the skin adjacent the ambient air inlet and having grillework integrally formed therein within the ambient air inlet, the grillework preferably being the only grillework. The front reinforcement further includes vehicle light housings integrally molded therewith and extending laterally to the fender area of the hood, the hood skin being bonded to the light housings. The light housings preferably receive both the headlight and the turn signal which are inserted through apertures in the exterior skin of the hood.

DESCRIPTION OF THE DRAWINGS

Other objects and advantages of the invention will become more apparent upon perusal of the detailed description thereof and upon inspection of the drawings in which:

FIG. 1 is a front perspective view of a portion of the body of a highway truck incorporating a hood constructed in accordance with the invention, with the hood skin partially cut away;

FIG. 2 is a side view partially cut away of the truck of FIG. 1; and

FIG. 3 is a perspective view of the hood of FIG. 1 with the exterior skin removed.

DESCRIPTION OF THE PREFERRED EMBODIMENT

Referring now to the drawings, there is shown the forward portion of a highway truck 10, including a mobile frame or chassis 12 supported by wheel 14 and driven by engine 16 supported thereon. Mounted on the rearward portion of chassis 12 is an operator's cab partially shown at 18 including a cowl portion 20 which functions as the rear wall of the engine compartment 22 of the truck 10.

A vehicle hood generally designated 24 is mounted to the chassis 12 forward of the cab 18 as by hinge 26, the rear end of the hood abutting against the cowl 20 to enclose the engine compartment 22. As is conventional, the hood 24 is opened to expose the engine 16 by pivoting it about the horizontal pivot axis of hinge 26 so that hood 24 opens forwardly away from the chassis 12. The hood assembly comprises five parts which are bonded together to form a strong integral unit, the five parts comprising the exterior skin 28, the front reinforcement 30, left and right side reinforcements 32, and a rear reinforcement 34, the reinforcements 30, 32, 34 also being bonded to each other at their interfaces to increase the strength of the hood system and to provide a continuous ductwork within the hood 24 as will be seen hereinafter.

The exterior skin 28 is molded to enclose the engine compartment and includes a generally vertical forward wall 36 covering the front face of the hood 24, the forward wall 36 further defining a rectangular ambient air inlet 38 to the engine compartment therein for engine cooling purposes and for engine induction air as will be seen below. The skin 28 further includes a top portion 40 extending back to the cowl 20, the top portion having sidewalls 42 defining the engine compartment which extend downward to blend into fender portions 44 of the hood on both sides which encase the wheels 14 of the truck and extend forwardly to blend into the front wall 36. The fender portions 44 are provided with apertures 46 for receiving one or more lights, such as headlight 48 and turn signal 50.

Disposed adjacently behind the forward wall 36 and bonded to the inner side thereof is the front reinforcement 30. As best seen in FIG. 3, the front reinforcement 30 has several functions not present in previous front reinforcements in addition to its function of providing structural integrity to the forward center part of the hood. The front reinforcement 30 also has a rectangular picture frame opening 52 in register with the ambient air opening 38 in the skin for the passage of ambient air therethrough to the engine compartment 22. However, in our invention, the grille 54 through which ambient air enters is integrally molded as part of the front reinforcement 30 and includes horizontal crossbars 56 and vertical crossbars 58 all integrally joined together in a single molded part. Thus, the integral grille 54 reinforces the picture frame to resist racking loads thereon caused by a front tire hitting a bump.

The front reinforcement 30 is further provided with light housings 60 integrally molded thereinto. The light housings 60 have curved forward framing surfaces 62 defining a recess 64 for receiving and mounting headlight 48 and turn signal 50, the recess 64 being in registry with the light receiving aperture 46 in the exterior skin 28. In the bonding of the front reinforcement 30 to the exterior skin 28, the framing surfaces 62 are bonded to the inside of the skin about the entire periphery of the light apertures 46. This not only provides a light housing completely sealed from the wheel well area but also ties the skin at the fenders to the front reinforcement 30 resulting in greatly increased strength in this area.

As best seen in FIGS. 1 and 3, each of the reinforcements 30, 32, 34 defines, with the exterior skin 28, a portion of an interconnected ductwork for engine air leading on both sides of the hood from engine ambient air inlets 66 in the upper grille area to the air cleaner inlet 68 from the rear reinforcement 34. The engine air inlets 66 are disposed in the front reinforcement 30 at the upper corners of the ambient air inlet to the engine in a manner that the opening lies in a plane parallel to the path of travel. The inlet 66 opens into a generally vertical duct 70 formed between the rear wall 72 of the front reinforcement 30 and the exterior skin 28 of the hood and extends downwardly to an intersection with a duct 74 formed by the side reinforcement 32 and the exterior skin 28. As can be seen from FIG. 2, the angle of the centerline A of duct 70 and the centerline B of duct 74 is less than 90 degrees, thereby forcing the air around a sharp turn to cause entrained water and heavy particles to deposit out due to centrifugal force and also to gravity. As shown in FIG. 3, a drain hole 76 is provided in the bottom of the vertical duct 70 for the water and particles to drop out of the ductwork.

The duct 74 in the side reinforcement 32 extends rearward along the intersection of the hood side wall 42 and the fender 44 to an intersection with rear vertical duct 78 formed between the side portion of the rear reinforcement an the exterior skin. Again, the angle between the centerline B of duct 74 and the centerline C of the rear vertical duct 78 is slightly less than 90 degrees, thereby promoting the scrubbing action of the air. A drain hole 80 is provided in the rear wall 82 of duct 74 adjacent the bottom of the rear vertical duct 78.

The rear vertical duct 78 extends upwardly to an intersection with horizontal duct 84 formed by the top portion of the rear reinforcement 34 and the exterior skin 28 which extends across the inside of the hood to outlet port 68 which is disposed to sealingly engage an air cleaner 86 when the hood is closed in much the same manner as the aforesaid Sullivan patent which is incorporated herein by reference.

At its upper forward corner, the hood 24 is provided with a hand hold 88 which comprises a downturned flange 90 formed around the hand hold opening 88 in the outer skin 24 with the lower edge of the flange 90 being adjacent the aperture 92 in the upper center portion of the front reinforcement 30.

Thus, there has been provided, in accordance with the invention a truck hood reinforcement system which fully satisfies the objects, aims and advantages set forth above. It is recognized that others may develop variations, alternatives and modifications of the invention after a perusal of the foregoing specification. Accordingly, it is intended to cover all such variations, modifications, and alternatives as may fall within the scope of the appended claims.

What is claimed is:

1. In a vehicle hood of the type disposed to open forwardly of said vehicle and pivot about a horizontal axis to expose an engine compartment thereof, said hood having a plastic composite exterior skin defining a portion of said engine compartment, said skin including a forwardly located generally vertical portion defining an ambient air inlet to said engine compartment, and a generally vertical plastic composite front reinforcement member bonded to the inner side of said skin adjacent said vertical portion thereof, said front reinforcement member further defining an ambient air inlet passage between said ambient air inlet and said engine compartment, the improvement comprising grillework integrally formed in said front reinforcement member within said ambient air inlet passage.

2. The invention in accordance with claim 1 and said grillework being visible exteriorly of said hood and comprising the sole grille of said vehicle.

3. The invention in accordance with claim 1 and said grillework including integrally formed connected horizontal bars and vertical bars.

4. The invention in accordance with claim 1 and said front reinforcement including means for pivotally attaching said hood to said vehicle.

5. The invention in accordance with claim 1 and said exterior skin of said hood further defining fenders disposed on both sides of the engine compartment, said fenders having apertures therein for receiving vehicle lights, and said front reinforcement having housings for mounting said vehicle lights integrally formed on said front reinforcement and extending laterally from said grille portion to overlap said fender apertures.

6. The invention in accordance with claim 5 and said housings being bonded to the interior side of said skin.

7. The invention in accordance with claim 5 and said housings supporting vehicle headlights and turn signals.

8. In a vehicle hood of the type disposed to open forwardly of said vehicle and pivot about a horizontal axis to expose an engine compartment thereof, said hood having a plastic composite exterior skin defining a portion of said engine compartment, said skin including a forwardly located generally vertical portion defining an ambient air inlet to said engine compartment, said exterior skin of said hood further including integral fenders disposed on both sides of the engine compartment, said fenders having apertures therein for receiving vehicle lights, and a generally vertical front reinforcement member bonded to the inner side of said skin adjacent said vertical portion thereof, said front reinforcement member having a central portion reinforcing said ambient air inlet and light housing portions integrally molded thereinto and extending laterally from said central portion to distal ends disposed in overlapping relation with said light receiving fender apertures.

9. The invention in accordance with claim 8 and said housing portions being bonded to the interior side of said fenders.

10. The invention in accordance with claim 8 and said housings supporting vehicle headlights and turn signals.

11. The invention in accordance with claim 8 and said central portion of said front reinforcement further defining said ambient air inlet to said engine compartment, and reinforcing means molded in said front reinforcement and disposed within said ambient air inlet.

12. The invention in accordance with claim 11 and said reinforcing means comprising an exteriorly visible grille.

* * * * *